United States Patent [19]

Nalewajek et al.

[11] 4,375,453
[45] Mar. 1, 1983

[54] RECOVERY OF GADOLINIUM AND GALLIUM OXIDES

[75] Inventors: David Nalewajek, West Seneca; Eugene B. Recla; Robert A. Wiles, both of Hamburg; Richard E. Eibeck, Orchard Park, all of N.Y.

[73] Assignee: Allied Corporation, Morris Township, Morris County, N.J.

[21] Appl. No.: 334,719

[22] Filed: Dec. 28, 1981

[51] Int. Cl.$^3$ .................... C01G 15/00; C01F 17/00
[52] U.S. Cl. .................... 423/21.1; 423/111; 423/122; 423/132; 423/263; 423/624
[58] Field of Search .............. 423/21.1, 111, 122, 423/127, 132, 263, 624

[56] References Cited

U.S. PATENT DOCUMENTS 4,198,231 4/1980 Gusset .................... 423/21.1

FOREIGN PATENT DOCUMENTS 21990 7/1981 European Pat. Off. .......... 423/112

*Primary Examiner*—Herbert T. Carter
*Attorney, Agent, or Firm*—Arthur J. Plantamura; Jay P. Friedenson

[57] ABSTRACT

$Gd_2O_3$ and $Ga_2O_3$ are currently used for the fabrication of $Gd_3Ga_5O_{12}$ (GGG) wafers which are employed as substrates for bubble domain memory devices. In the processing, in the order of 25% of the starting material ends up as process "saw kerf" contaminated with variable amounts of iron, nickel, magnesium, aluminum, zirconium, iridium and silicon. A process is described whereby the "saw kerf" can be reprocessed in sufficient purity to be re-used in the process, thereby improving the economics of production of GGG wafers significantly. Gadolinium and gallium oxides are recovered and separated from transition metal impurities introduced during fabrication of GGG wafers. The process "saw kerf" produced from slicing the crystal boule is dissolved in HCl, treated with $H_2SO_4$, and the resulting sulfates separated. Metathesis with $(NH_4)_2C_2O_4$ results in conversion of the sulfates to the ammonium oxalates which were calcined at 850° C. to form $Ga_2O_3$ and $Gd_2O_3$ of purity >99.99%. The process can be extended to include purification and re-use of by-products generated in other grinding and polishing operations which may result in the recycling of the order of 80% of the generated by-products.

3 Claims, No Drawings

RECOVERY OF GADOLINIUM AND GALLIUM OXIDES

This invention relates to a method for recovering the essential elements from manufacturing by-products more particularly to the recovery of gadolinium and gallium by-products generated during fabrication of gadolinium gallium garnet (GGG) wafers in a purity suitable to be recycled in the process. In particular, the GGG by-products are transformed to compounds which can be conveniently separated from each other and transition metal impurities (based on solubilities) and converted to high purity oxides.

BACKGROUND OF THE INVENTION

In the last decade, the electronics industry has invested substantially in time and money in bubble device technology. The attraction for this investment has centered on the expectation of a rapidly expanding buble memory market. These devices serve to span the gap between expensive semiconductors and the mechanically sensitive magnetic disks and tapes.

The substrate material for these devices is composed of a stoichiometric composition of gadolinium-gallium oxides, $Gd_3Ga_5O_{12}$, commonly referred to as gadolinium-gallium garnet or GGG. Current fabrication techniques for these materials result in the generation of the order of 80% by-products that are based on relatively expensive starting materials. A method for the recovery and separation of high purity oxides, so that the material could be re-used in the process in a practical manner would aid significantly the economics of production of GGG wafers.

While the problem of by-product recovery and purification has existed for a number of years in the industry, and attempts to recover by-products have been reported such as the means that involves digesting the scrap material, precipitating the gadolinium and electrolytically depositing the gallium as described in U.S. Pat. No. 4,198,231, no satisfactory practical way is known for efficiently recovering the by-product in an economically attractive manner. It is thus apparent that a need exists for improved means to recover gadolinium and gallium in view of the substantial economies involved.

SUMMARY OF THE INVENTION

Important aspects of the invention reside in the fact that reprocessing of the by-products is accomplished by using inexpensive raw materials for dissolution, precipitation and isolation. Furthermore, by employing selective acids, precipitation of only the desired salts of gadolinium and gallium can be attained free of transition metal impurities deleterious to the growth of GGG crystals.

The by-product material, consisting of $Gd_3Ga_5O_{12}$, to be reclaimed is separated from lubricating oil by vacuum filtration, thermally treated to remove any remaining organic substrate which adheres to the particles, is dissolved in mineral acids and, after digestion to ensure maximum dissolution, the solution is filtered to remove insoluble particles. The gadolinium and gallium salts are then precipitated from the particle free solution by means which involve the isolation of gadolinium and gallium as the sulfates, either combined or separated, followed by their conversion to the oxides.

The precipitation and separation of gadolinium sulfate from gallium sulfate and impurities is performed in an acidic medium at a pH~0.5 by adding sulfuric acid, in an approximate 1.5 stoichiometric excess, to the filtrate to precipitate the insoluble gadolinium sulfate compound, $Gd_2(SO_4)_3.8H_2O$, as a microcrystalline solid. The precipitate is stirred and separated from the mother liquor and impurities by conventional methods. The cake of gadolinium sulfate which is obtained, is washed to remove traces of mother liquor, and dried.

The gadolinium sulfate is suspended in water or dissolved in a solution of water/nitric acid and precipitated by the addition of solid ammonium oxalate, filtered and washed with a dilute solution of ammonium oxalate. The amonium gadolinium oxalate recovered is calcined to gadolinium oxide of a high purity level.

The mother liquor filtrate from the gadolinium sulfate is reduced in volume by distillation, to precipitate the gallium sulfate. The solid mass is dissolved in water and the solution is added to ethanol or alternate precipitant. The gallium sulfate precipitates as a microcrystalline solid, is separated from the soluble transition metal impurities by conventional filtration techniques, washed with ethanol or other suitable absorbent for water and dried in a vacuum oven. The total yield from this process is in the order of and may exceed 95%.

The gallium sulfate is converted to ammonium gallium oxalate and gallium hydroxide by the addition of ammonium oxalate and ammonium hydroxide. The total yield of this process is of the order of 95%.

Alternatively, the gadolinium and gallium sulfates may be co-precipitated. The gadolinium is separated from the gallium by precipitating the ammonium gadolinium oxalate salt in an acidic medium and the gallium is recovered by adjusting the pH of the filtrate in the range of 7-9 thus inducing the co-precipitation of ammonium gallium oxalate and gallium hydroxide. Gadolinium sulfate was precipitated as above described and the solution which contains the gallium sulfate is reduced in volume by distillation, inducing the precipitation of gallium sulfate, water is added to the combined sulfates and the mixture poured into an excess of 95% ethanol. The high purity co-precipitated sulfates, $Ga_2(SO_4)_3$ and $Gd_2(SO_4)_3$ which form in yields of about 95% are washed as described above.

The gadolinium can be separated from the gallium by precipitating ammonium gadolinium oxalate in an acidic medium and the pH of the filtrate adjusted to 7-9 with ammonium hydroxide resulting in co-precipitation of ammonium gallium oxalate and gallium hydroxide. These co-precipitates are filter washed dried and calcined. The conversion to gallium oxide, $Ga_2O_3$, of 99.99% purity is of the order of and can exceed 95%.

DETAILED DESCRIPTION OF THE INVENTION

While the process of the invention is described specifically with reference to the residue or "saw kerf", derived from slicing the crystal boules into wafers, the invention can be extended to include the purification of by-products generated in other manufacturing stages. Minor revisions in the pre-treatment of the by-products may be necessary. These can include: (a) grinding (ball milling) of boule heels or boule ends before dissolution; (b) cracking of these same boule entities by thermal shock treatment before dissolution or (c) washing the by-products generated during polishing steps with a liquid organic, e.g., a chlorofluorocarbon solvent, to eliminate lubricating oils.

In the reprocessing of saw kerf, the material to be reclaimed is separated from lubricating oil by vacuum filtration and then thermally treated at 700° C. to remove any remaining organic substrate which adheres to the particles. This treated material, which consists of gadolinium-gallium oxide, $Gd_3Ga_5O_{12}$, and transition metal impurities identified as magnesium, nickel, zirconium, aluminum, iron and silicon, as well as diamond dust, and aluminum oxide particles is dissolved in mineral acids, preferably hydrochloric acid. However, nitric acid may also be used. After digestion for 3 hours to ensure maximum dissolution, the solution is filtered to remove insoluble particles. These particles consist mainly of diamond dust, aluminum oxide and $Gd_3Ga_5O_{12}$ of particle size >250 μm. If substantial amounts of $Gd_3Ga_5O_{12}$ are collected on the filter, they can be ground to a smaller size and treated again with mineral acid. However, this is not usually observed when dealing with saw kerf. The gadolinium and gallium salts are then precipitated from the particle free solution by one of two ways described below, both of which involve the isolation of gadolinium and gallium as the sulfates either combined or separated followed by their conversion to the oxides.

METHOD A

The precipitation and separation of gadolinium sulfate from gallium sulfate and impurities is performed in an acidic medium at a pH of about 0.5.

After pre-treating the saw kerf as discussed above sulfuric acid in a 1.5 stoichiometric excess is added to the filtrate to precipitate the insoluble gadolinium sulfate, $Gd_2(SO_4)_3.8H_2O$, as a fine, white, microcyrstalline solid. The precipitate, which forms immediately is stirred for 4 hours and separated from the mother liquor and the transition metal impurities (which remain soluble) by conventional methods, either vacuum filtration or centrifugation. The cake of gadolinium sulfate, thus obtained, is washed with a 50/50 by volume mixture of water/ethanol to remove the last traces of the mother liquor, and dried at 50° C. in a vacuum oven. The total yield of gadolinium sulfate from this procedure is of the order of and may exceed 95%.

The gadolinium sulfate is then converted to the ammonium gadolinium oxalate salt, $NH_4Gd(C_2O_4)_2.H_2O$ by treatment with ammonium oxalate. The gadolinium sulfate is suspended in water or dissolved in a 70/30 by volume solution of water/nitric acid and precipitated by the addition of solid ammonium oxalate. After stirring for 4 hours, the solution is filtered and the precipitate washed with a dilute solution (2%) of ammonium oxalate. The ammonium gadolinium oxalate which is recovered in >95% yield is calcined at 850° C. to gadolinium oxide, $Gd_2O_3$, of a 99.99% purity level.

The filtrate from the first step is reduced about 50% in volume by distillation whereupon the gallium sulfate, $Ga_2(SO_4)_3.18H_2O$ precipitates from the solution. A sufficient amount of water is added to the solid mass to dissolve it. Slight warming at 50° C. fascilitates the dissolution. The contents are added to a flask containing a vigorously stirred volume of 95% ethanol equal to about twice the volume of the gallium sulfate solution being added. The gallium sulfate precipitates slowly as a fluffy, white, microcrystalline solid. The precipitation is complete within 4–6 hours, however, it is recommended to stir the solution overnight at room temperature. The gallium sulfate thus obtained is separated from the soluble transition metal impurities by conventional filtration techniques, washed with 95% ethanol and dried at 50° C. in a vacuum oven. The total yield from this process can exceed 95%.

The gallium sulfate is converted to ammonium gallium oxalate, $NH_4Ga(C_2O_4)_2$, and gallium hydroxide, $Ga(OH)_3$, by the addition of ammonium oxalate and ammonium hydroxide.

Gallium sulfate is dissolved in water and a stoichiometric amount of solid ammonium oxalate is added. The pH of the solution is adjusted to 7-9 by the dropwise addition of ammonium hydroxide. The ammonium gallium oxalate and gallium hydroxide which co-precipitate are stirred for 4 hours, filtered by conventional techniques, washed with water, dried, and calcined at 850° C. to form gallium oxide, $Ga_2O_3$, of 99.99% purity. The total yield of this process can exceed 95%.

METHOD B

In this method, the gadolinium and gallium sulfates are co-precipitated. The gadolinium is separated from the gallium by precipitating the ammonium gadolinium oxalate salt in an acidic medium at a pH of about 1-2. The gallium is recovered by adjusting the pH of the filtrate to about 7-9 thus inducing the co-precipitation of ammonium gallium oxalate and gallium hydroxide.

Gadolinium sulfate was precipitated as described in Method A. The solution which contains the gallium sulfate is reduced in volume by about 50% by distillation, inducing the precipitation of gallium sulfate. About 25% water (by volume) is added to the combined sulfates and the mixture poured into a two-fold excess (by volume) of 95% ethanol. The high purity, co-precipitated sulfates, $Ga_2(SO_4)_3$ and $Gd_2(SO_4)_3$ which form are stirred for (a suitable period of time, e.g., of the order of 4 hours, then washed as described in Method A. The yield for this procedure can exceed 95%. The gadolinium can be separated from the gallium by precipitating ammonium gadolinium oxalate in an acidic medium.

The mixed sulfates are dissolved in a water-nitric acid solution with a pH 1. A stoichiometric amount of ammonium oxalate is added inducing the precipitation of the gadolinium salt, $NH_4 Gd(C_2O_4)_2$. The precipitate is treated as described in Method A. The conversion to $Gd_2O_3$ can exceed 95%. A purity level of 99.99% is routinely obtained.

The pH of the filtrate is adjusted to 7-9 with ammonium hydroxide resulting in co-precipitation of ammonium gallium oxalate and gallium hydroxide. These salts are treated as described in Method A. The conversion to gallium oxide, $Ga_2O_3$, of 99.99% purity can exceed 95%.

The several features and advantages of the invention will be apparent in greater detail by the following examples. It will be understood, however, that although these examples may describe in detail certain preferred operation conditions of the invention, they are given primarily for purposes of illustration and the invention in its broad aspects is not limited thereto.

EXAMPLE 1

Dried saw kerf, recovered from gadolinium gallium garnet, $Gd_3Ga_5O_{12}$, of composition 54% gadolinium oxide and 46% gallium oxide, was thermally treated at 700° C. for 3 hours to decompose volatile impurities 1500 grams of the thermally treated material, with a particle size ≦250 μm, was refluxed for 3 hours in 3700 ml of 37% hydrochloric acid. The solution which contained gadolinium chloride and gallium chloride, was filtered to remove 6 gms of insoluble particles.

To this vigorously stirred filtrate was added 2600 grams of sulfuric acid (specific gravity 1.84) over a one hour period. Precipitation of gadolinium sulfate began immediately. After 4 hours of stirring, the sulfate was filtered, the crystals slurried in 1000 ml of 50/50 (vol/vol) water/ethanol, refiltered and dried at 50° C. 1622 grams (97% yield) of gadolinium sulfate were recovered.

The filtrate from the gadolinium recovery was reduced to a soft paste by distilling 2200 ml of water/hydrochloric acid mixture. After the temperature was reduced to 50° C., 1300 ml of de-ionized water was cautiously added. The resulting clear solution was added to 7600 ml of 95% ethanol and vigorously stirred. Gallium sulfate began to precipitate after the temperature reached 40° C. The mixture was stirred overnight, then filtered. The filter cake was slurried for 0.5 hours in 5000 ml of chilled (0° C.), 95% ethanol, filtered and dried at 50° C. 2600 grams (95% yield) of gallium sulfate were recovered.

The gadolinium sulfate (1622 grams) obtained in step 1 was suspended in 2000 ml of water or dissolved in 2000 ml of a 70/30 (vol/vol) water/nitric acid solution. 1235 grams of solid ammonium oxalate was added. The precipitation of ammonium gadolinium oxalate began immediately. The mixture was stirred for 4-6 hours, filtered, washed with 500 ml of a 2% ammonium oxalate solution and calcined at 850° C. to yield 770 g (95% yield) of gadolinium oxide, $Gd_2O_3$.

| Analysis (ppm) | | | | | |
|---|---|---|---|---|---|
| Fe | Ni | Mg | Zr | Si | Al |
| 1.3 | 0.5 | 0.1 | 14 | 10 | 3.7 |
| Purity based on this analysis = 99.998% | | | | | |

The gallium sulfate (2600 grams) obtained in step 1 was dissolved in 2000 ml of water. 1970 grams of ammonium oxalate was added and the pH adjusted to 8.5 with ammonium hydroxide. Ammonium gallium oxalate and gallium hydroxide precipitated immediately. Stirring was continued for 4-6 hours followed by filtration, washing (500 ml of $H_2O$) and calcination at 850° C. 640 grams (93% yield) of gallium oxide was recovered.

| Analysis (ppm) | | | | | |
|---|---|---|---|---|---|
| Fe | Ni | Mg | Zr | Si | Al |
| 18.4 | 4.2 | 2.3 | 1 | 5.0 | 5.8 |
| Purity based on this analysis = 99.996% | | | | | |

EXAMPLE 2

1500 grams of saw kerf was heat treated and dissolved as described in example 1. 2600 grams of sulfuric acid was added, the solution stirred for 4 hours, and the volume reduced by 2200 ml. At this stage, both gadolinium and gallium sulfates precipitated. 1300 ml of $H_2O$ were added and the suspension poured into 7600 ml of 95% ethanol. After stirring overnight, the combined sulfates were filtered, washed with 1500 ml of 95% ethanol and dried. Yield of combined sulfates was 4304 grams (97% recovery).

The combined sulfates (4304 grams) were dissolved in 4000 ml of 70/30 (vol/vol) solution of water/nitric acid. 3300 grams of ammonium oxalate were added. The ammonium gadolinium oxalate which precipitated immediately was stirred for 4 hours, filtered, washed and calcined as described in example 1. Yield of gadolinium oxide $Gd_2O_3$ was 775 grams (96% recovery).

| Analysis (ppm) | | | | | |
|---|---|---|---|---|---|
| Fe | Ni | Mg | Zr | Si | Al |
| 0.5 | 1.3 | 0 | 30.5 | 7.4 | 8.5 |
| Purity = 99.995% | | | | | |

Ammonium gallium oxalate and gallium hydroxide were precipitated by adjusting the pH of the filtrate to 8. After stirring, filtering, washing and calcining as described in example 1, 660 grams (96% yield) of gallium oxide, $Ga_2O_3$ were isolated.

| Analysis (ppm) | | | | | |
|---|---|---|---|---|---|
| Fe | Ni | Mg | Zr | Si | Al |
| 9.0 | 0.6 | 7.5 | 1.5 | 33 | 12.0 |
| Purity - 99.994% | | | | | |

It will be understood that variations may be made in the several conditions and ranges disclosed and that these disclosed limitations, provided in order to more particularly describe the invention, should not be regarded as limitations except as set forth in the claims which follow:

What is claimed is:

1. A method for recovering gadolinium and gallium oxides from by product material which contains both of these oxides and various impurities comprising the steps of:
    (a) dissolving the gadolinium and gallium oxide in a strong mineral acid selected from the group consisting of hydrochloric and nitric acids,
    (b) isolating the filtrate and precipitating gadolinium sulfate from said filtrate by adding thereto sulfuric acid,
    (c) separating washing and drying the precipitated gadolinium sulfate,
    (d) converting the gadolinium sulfate salt from step (c) to ammonium gadolinium sulfate by dissolving the sulfate salt and precipitating with ammonium oxalate and calcining the recovered ammonium gadolinium oxalate to yield gadolinium oxide,
    (e) distilling the filtrate from step (b) to reduce the volume and thereby precipitate therefrom gallium sulfate,
    (f) separating and dissolving the precipitate from step (e) in water and precipitating the gallium sulfate from the aqueous solution with excess ethanol,
    (g) washing and drying the gallium sulfate obtained in step (f), dissolving this salt in water, treating the solution with ammonium oxalate and precipitating from said solution, by the addition of ammonium hydroxide, ammonium gallium oxalate and gallium hydroxide and
    (h) isolating, drying and calcining precipitate from step (g) to form gallium oxide.

2. The method of claim 1 wherein the gadolinium sulfate from step (c) and the gallium sulfate from step (f) are dissolved in water and co-precipitated by excess ethanol and washed, whereby the gadolinium is separated from the gallium by dissolving the mixture in strongly acidic aqueous nitric acid solution, adding a stoichiometric amount of ammonium oxalate to precipitate the gadolinium salt adjusting the separated filtrate to a pH in the range of 7–9 with ammonium hydroxide and washing, drying and calcining the resulting ammonium gallium oxalate and gallium hydroxide precipitates.

3. The method of claim 1 wherein the gadolinium and gallium oxide dissolved in step (a) is preheated to remove organic impurities.

* * * * *